United States Patent [19]

Guccione et al.

[11] 4,376,546
[45] Mar. 15, 1983

[54] VEHICLE FRONT END SHIELD

[75] Inventors: Leo A. Guccione, Carlsbad; David Millar, San Diego, both of Calif.

[73] Assignee: Timothy Long, San Diego, Calif.

[21] Appl. No.: 251,012

[22] Filed: Apr. 3, 1981

Related U.S. Application Data

[63] Continuation-in-part of Ser. No. 104,110, Dec. 17, 1979, abandoned.

[51] Int. Cl.³ .............................................. B60R 27/00
[52] U.S. Cl. ..................................... 280/770; 16/252;
150/52 K; 296/95 R
[58] Field of Search ............ 280/770; 180/68 P, 68 R;
150/52 K; 296/136, 78 R, 91, 1 R, 95 R;
160/368 A, 368 R, DIG. 1, DIG. 2; 49/497;
16/175, 176, 252

[56] References Cited

U.S. PATENT DOCUMENTS 4,042,741  8/1977  Bright .............................. 49/497 X
4,245,863  1/1981  Carter ............................. 296/36 R
4,263,750  4/1981  Hein ................................ 49/497 X

FOREIGN PATENT DOCUMENTS 2000861  7/1971  Fed. Rep. of Germany ...... 296/136

OTHER PUBLICATIONS

Electrodyne, Fall—Winter Catalog, 1973-1974, 2316 Jefferson Davis Highway, Alexandria, Va. 22301, P4.

Primary Examiner—Robert J. Spar
Assistant Examiner—Donald W. Underwood
Attorney, Agent, or Firm—Charmasson, Branscomb & Holz

[57] ABSTRACT

A front end shield is provided for a car which is rigid and has a peripheral soft resilient tube mounted around the underside to space the planar part of the shield from the surface of the vehicle, there being a pair of headlight covers attached to the retractable headlight mechanisms to complete front end coverage, the shield being made either as a single piece or in two halves to permit easy storage.

8 Claims, 10 Drawing Figures

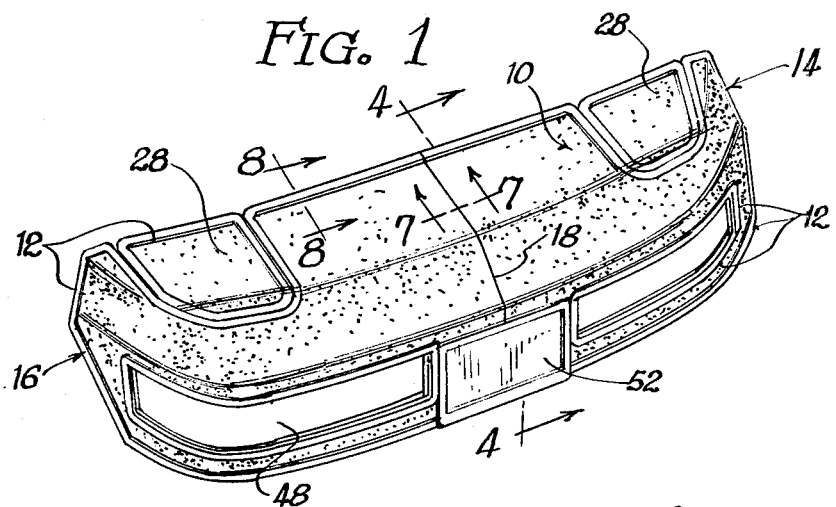
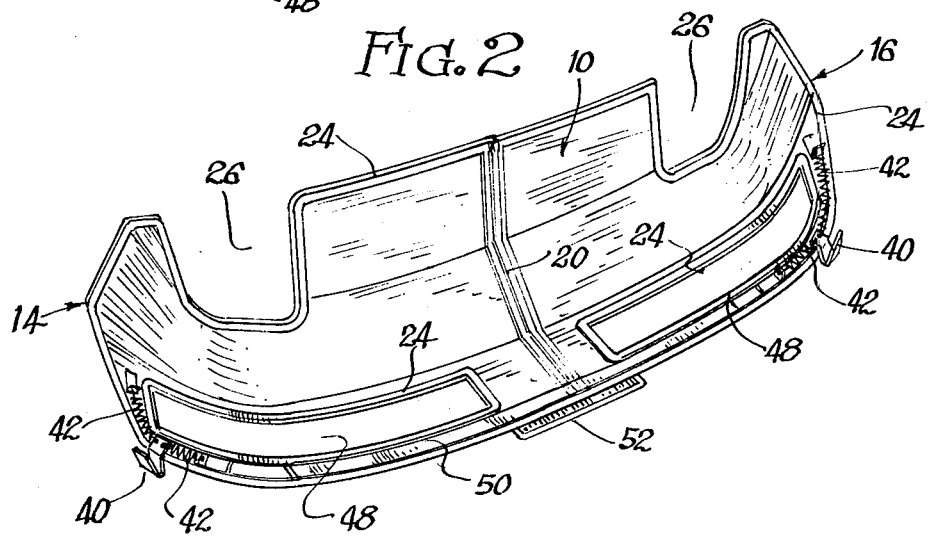
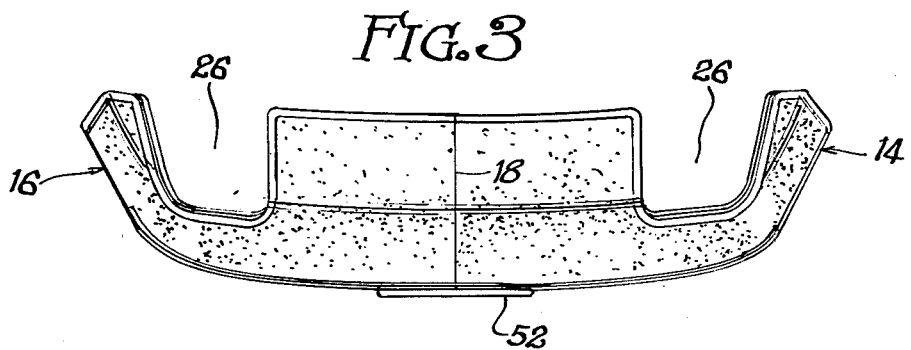

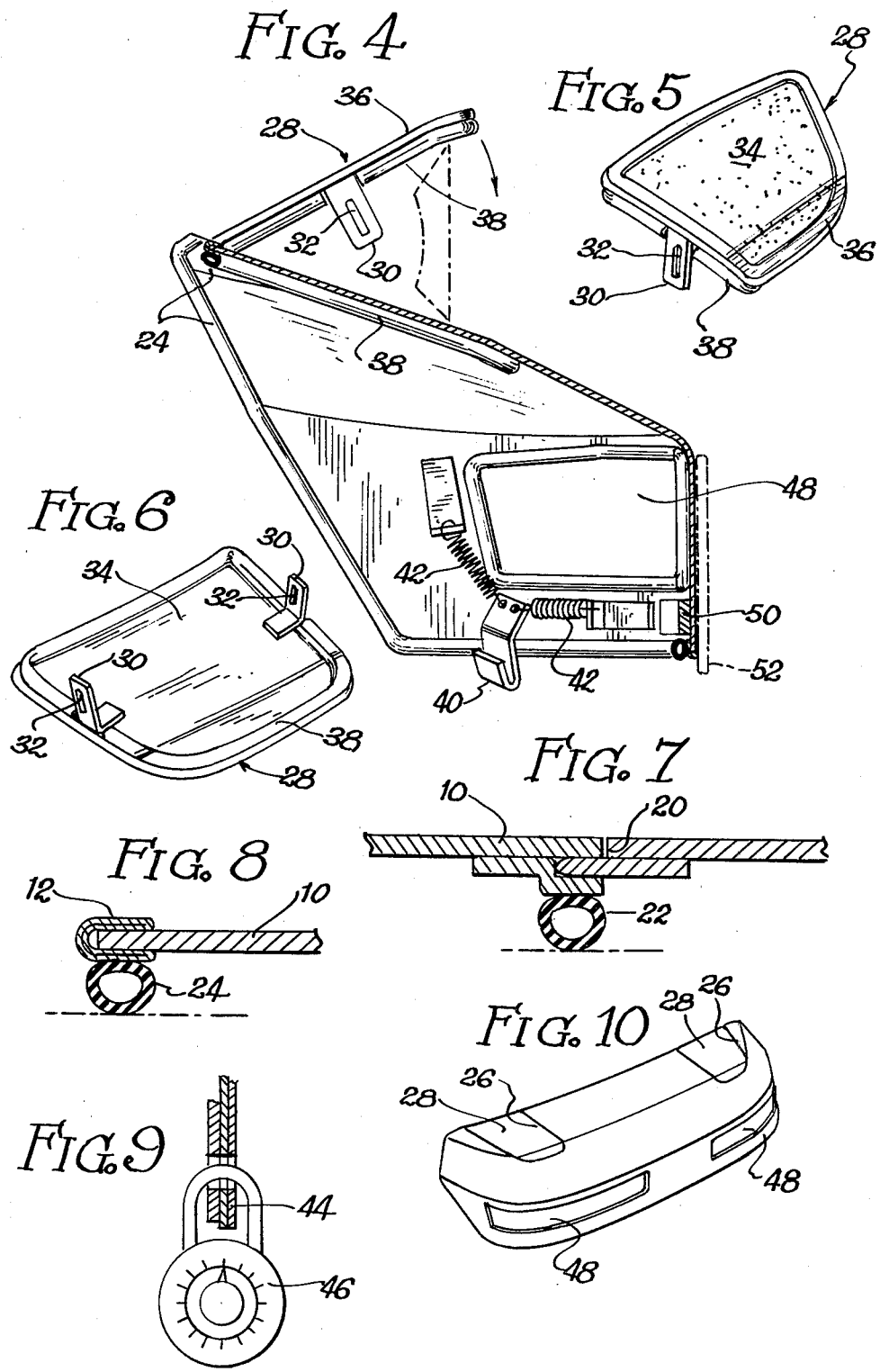

VEHICLE FRONT END SHIELD

PRIOR APPLICATION

This application is a continuation-in-part of Ser. No. 104,110 filed Dec. 17, 1979, now abandoned.

BACKGROUND OF THE INVENTION

Typically, covers for the fronts of motor vehicles, especially Porsches, are made out of a flexible plastic material such as vinyl or, for true luxury, they are made out of leather. In either instance, because the cover is flexible, naturally it cannot provide the resistance from dings and dents from rocks flying off the roadway surface that a rigid shield could provide.

Additionally, especially with the leather models, the contact of the surface of the cover actually leaches and discolors the finish on the vehicle.

Even with these drawbacks, however, the prevailing use of the flexible "bra" for the front end of a sports car stands testimony to the desireability of protecting that part of the vehicle which takes most of the abuse from roadway objects and airborne particles. There is a need, however, for a "bra" that offers even a greater degree of protection, and does not directly contact the finish of the car in most places, and thus does not leach the finish.

SUMMARY OF THE INVENTION

The present invention fulfills the above stated need by incorporating a rigid, form-fitted panel which conforms very closely to the surface of a car and which has a peripheral resilient bead which spaces the panel from the surface of the vehicle to prevent leaching. This added space also provides a buffer zone in the event the panel is struck with rocks or other heavy, fast-moving objects so that upon impact, the spaced panel distributes the impact force over its entire surface as it deflects rather than transmitting it directly to the vehicle body as it would if it were in direct contact.

In one embodiment the shield is provided in two pieces which can readily be removed and easily stored if desired. In both embodiments, rigid retractable headlight mechanism covers are included, providing a dimension of protection not available in the flexible cover design.

BRIEF DESCRIPTION OF THE DRAWINGS

FIG. 1 is a perspective view of the shield in its split halves implementation;

FIG. 2 is a view from the underside of the shield;

FIG. 3 is a top elevation view of the shield;

FIG. 4 is a section taken along line 4—4 of FIG. 1;

FIG. 5 is a perspective of the left retractable headlight mechanism cover;

FIG. 6 is a perspective of the bottom of the cover of FIG. 5;

FIG. 7 is a section taken along line 7—7 of FIG. 1;

FIG. 8 is a section taken along line 8—8 of FIG. 1;

FIG. 9 is a diagrammatic view of a detail showing a lock holding the two halves together;

FIG. 10 is a perspective of the shield as illustrated above but having a one-piece panel which spans the entire width of the car.

DETAILED DESCRIPTION OF THE PREFERRED EMBODIMENT

The main body of the shield is made from a panel 10 which is a rigid hard plastic such as PVC. The plastic is form fitted to conform as closely as possible to the actual contours of the exterior surface of the vehicle (not shown), and the perimeter of the panel is capped with a continuous trim strip 12, which is also a tough plastic.

In the principal illustrated embodiment of FIGS. 1 through 9, the panel 10 is formed in two mirror image halves 14 and 16 which join together at a midline 18 and releasably mate by virtue of the tongue-and-groove structure 20 best seen in FIG. 7. This midline may not have the trim strip 12 attached, but one half should preferably have mounted thereto the continuous spacer bead 22, which also extends around the entire perimeter of the structure as indicated at 24. In the preferred construction, this bead is a hollow tube indicated in FIG. 8, although any soft spacing element would work provided its surface is such that it will not mar the surface of the car or leach the paint from it or otherwise leave marks. The attachment of the trim strip and the hose 24 is well illustrated in FIG. 8.

Turning to the overall construction of the unit, a pair of cutouts 26 are provided for the headlights. As ordinarily the headlights would be retractable and each be housed in a retracting mechanism, headlight covers 28 are mounted directly to the headlight retract mechanism by virtue of flanges 30 which have screw slots 32 therein through which screws are engaged which enter pilot holes found in the sides of each retractable headlight mechanism.

Each of the headlight covers 28 is made of its own small panel 34, trim strip 36 and spacer bead 38, and conforms closely to the construction of the remainder of the shield except that they move independently with the headlights which they cover. They, like the rest of the paneling, are spaced from the headlight lids which are part of the vehicle.

Attachment of the shield to the vehicle is accomplished by strap hooks 40 each of which is mounted on a double spring 42 so that between the two hooks, each of which engages an opposite wheel well, 4-point restraint is exerted on the shield. These two hooks with their double extension spring mounts are adequate to hold either of the embodiments, that is single piece or double piece, firmly in place on the front of a vehicle. Additionally, in either model but especially with the two piece unit, a pair of flanges 44 which abut one another and have aligning bores therethrough may be used to secure the two halves together with a lock such as 46, through which ordinarily another frame member, or a chain from a frame member, would extend so that the two pieces are not only locked together but locked to the vehicle to prevent theft.

Ordinarily beneath the headlights in sports vehicles are horizontal rows of auxilliary lights such as turn signals and parking lights, and openings 48 are defined in the front of a shield to accomodate these lights. These openings are trimmed and provided with the spacer bead as are the rest of the edges of the panel, and beneath these openings to provide additional support due to the large extent of the openings, is a long reinforcing bar 50, contoured out of a preferably plastic bar of sufficient thickness to strengthen the area weakened by the openings 48. This bar is, of course, bisected in the split panel embodiment.

A license plate 52 may be mounted directly on the front of the shield as shown in FIGS. 1 through 4, or the area to which the license plate is mounted could be left open to expose the plate mounted directly to the underlying vehicle. Naturally if the plate is mounted to the shield and the shield comes in two parts, the plate must be mounted to either one part or the other, but ideally not both as obvious problems exist upon trying to remove the unit.

In either embodiment, the unit provides an especially practical and attractive edition to any sports car on which the unit will fit, protecting all of the front of the vehicle other than the auxilliary lights, and including the tops of the retractable headlights, with all portions of the shield being spaced away from the body of the vehicle both to protect the finish against damage to the finish by the shield itself, and also to insulate against impacts of heavy objects.

We claim:

1. A protective shield, for use on a vehicle front around the headlight area, said vehicle being of the type having retractable headlight mechanisms, each of said mechanisms defining a pair of oppositely directed lateral pilot holes, which comprises:

a rigid formed panel having cutouts for the vehicle headlights;

said panel being shaped to conform to the front of the vehicle around the headlight area;

a soft spacer bead lining the periphery of said panel to space said panel from the surface of said vehicle to which said shield is applied;

means for attaching said panel to the vehicle;

a pair of headlight covers dimensioned to substantially span said cutouts; and means gripping the respective headlight mechanisms to retain said covers in place comprising depending slotted flanges engaged on said holes by screws passing through the respective slots in said flanges.

2. Structure according to claim 1 wherein each of said headlight covers comprises a rigid panel with a peripheral soft bead spacing same from the top of a retractable headlight mechanism.

3. A shield according to claim 1 wherein said panel comprises a plastic sheet with a continuous trimstrip bonded around the edges and said bead comprises a resilient tube bonded to said trim strip.

4. A shield according to claim 1 wherein said panel comprises two longitudinally bisected halves.

5. A shield according to claim 4 wherein said halves meet along a junction line and define separably mating tongue and groove structure.

6. A shield according to claim 5 wherein at least one of said halves has a spacer bead along the edge resulting from said bisection.

7. A shield according to claim 5 and including means to lock said halves together.

8. Structure according to claim 1 wherein said vehicle defines a pair of headlights on the upper portion of the front thereof and a plurality of auxilliary lights defined in a pair of horizontal bands across the front below said headlights, said panel defining a pair of elongated openings to accomodate said auxilliary lights, said openings having a peripheral soft bead around the edge thereof to space same from the surface of the vehicle, and including a reinforcing bar passing below said auxilliary light openings bonded to said panel and substantially spanning the width of said panel.

* * * * *